April 23, 1929.  S. G. DOWN  1,710,047
DOOR AND BRAKE CONTROL DEVICE
Filed Jan. 4, 1928
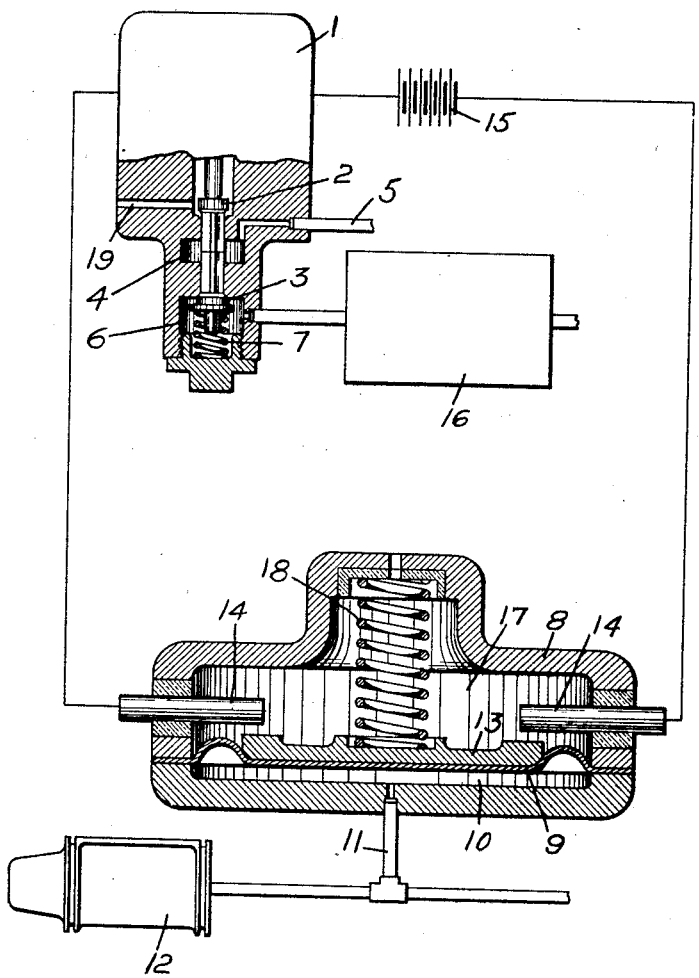
INVENTOR
SIDNEY G. DOWN
BY *Wm. M. Cady*
ATTORNEY Patented Apr. 23, 1929.

1,710,047

UNITED STATES PATENT OFFICE.

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

DOOR AND BRAKE CONTROL DEVICE.

Application filed January 4, 1928. Serial No. 244,391.

This invention relates to door and brake controlling devices and has for its principal object to provide electrically controlled means for controlling the supply of fluid under pressure for effecting the opening of the car doors and in which the supply of fluid under pressure is available only when the brakes are applied.

In the accompanying drawing, the single figure is a diagrammatic view, partly in section, of a door and brake controlling apparatus embodying my invention.

As shown in the drawing, a magnet valve device is provided comprising an electromagnet 1 and double beat valves 2 and 3 adapted to be operated by said magnet. A chamber 4 intermediate said valves is connected to a pipe 5, which pipe constitutes the supply pipe from which fluid under pressure is supplied for effecting the opening of the car doors and unless the pipe 5 is supplied with fluid under pressure, the car doors cannot be opened.

The valve 3 is contained in a valve chamber 6 and is subject to the pressure of a coil spring 7 tending to seat the valve, and chamber 6 is connected to a main reservoir 16 or other source of fluid pressure supply.

A switch device is also provided comprising a casing 8 containing a flexible diaphragm 9, having chamber 10 at one side connected through pipe 11 with the brake cyilnder 12. Associated with the diaphragm 9 is a bridging contact member 13 adapted when moved by the diaphragm to connect fixed contact members 14. The fixed contact members 14 are connected to a circuit including the magnet 1 and a source of current 15.

Mounted in chamber 17 is a coil spring 18 which engages the member 13 and urges said member and the diaphragm 9 to the posiiton in which the magnet circuit is opened, as shown in the drawing.

In operation, when the brakes are released and there is no fluid pressure in the brake cylinder 12, the chamber 10 of the switch device is at atmospheric pressure and the spring 18 maintains the contact member 13 in the open position. The magnet 1 is therefore deenergized and the valve 3 is maintained seated by the spring 7, while the valve 2 is held unseated, so that chamber 4 and supply pipe 5 are connected to an atmospheric port 19. It will thus be seen that with the brakes released, the operator cannot open the car doors, since there is no fluid under pressure supply in the pipe 5.

When the brakes are applied and fluid under pressure is supplied to the brake cylinder 12, fluid under pressure is also supplied to the chamber 10, so that the diaphragm 9 is operated to cause the contact member 13 to bridge the contact members 14 and thereby close the circuit through the magnet 1. The magnet 1 being thus energized, the valve 2 is seated, while the valve 3 is unseated, so that fluid under pressure is supplied from the main reservoir 16 to the door opening supply pipe 5. The operator may now effect the opening of the car doors in the usual manner, as will be evident.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a fluid pressure supply pipe, fluid under pressure from which is employed to control the car doors, of electrically controlled means for controlling the supply of fluid under pressure to said pipe and means operated upon applying the brakes for operating said electrically controlled means to supply fluid under pressure to said pipe.

2. The combination with a fluid pressure supply pipe, fluid under pressure from which is employed to control the car doors, of a source of fluid under pressure, a valve for controlling the supply of fluid from said source to said pipe, a magnet for operating said valve, and a switch device operated upon applying the brakes for controlling the circuit of said magnet.

3. The combination with a fluid pressure supply pipe, fluid under pressure from which is employed to control the car doors, of a source of fluid under pressure, a valve for controlling the supply of fluid from said source to said pipe, a magnet for operating said valve, and a switch device operated only upon applying the brakes for closing the circuit of said magnet to thereby open said valve.

4. The combination with a fluid pressure supply pipe, fluid under pressure from which is employed to control the car doors, of a source of fluid under pressure, double beat valves for connecting said pipe to said source of pressure or to the atmosphere, a magnet for operating said valves, a switch device for controlling the circuit of said magnet, a brake cylinder, and a movable abutment controlled by brake cylinder pressure for operating said switch device.

In testimony whereof I have hereunto set my hand.

SIDNEY G. DOWN.